United States Patent Office 3,113,136
Patented Dec. 3, 1963

3,113,136
2-(ALPHA-LOWER ALKENYL, ALPHA-HYDROXY-BENZYL)-BENZIMIDAZOLE
Arthur F. Wagner, Princeton, and Karl A. Folkers, Plainfield, N.J., assignors to Merck & Co., Inc., Rahway, N.J., a corporation of New Jersey
No Drawing. Filed Nov. 1, 1961, Ser. No. 149,212
4 Claims. (Cl. 260—309.2)

This invention relates to new co-monomers comprising alkenyl benzimidazoles. More specifically, this invention relates to a compound of the formula

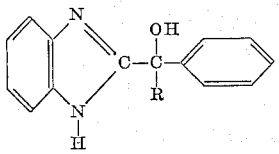

in which R is lower alkenyl.

The compounds of this invention are useful as co-monomers in the preparation of acrylic and vinyl polymers. Especially they are useful in copolymerization with such compounds as methyl methacrylate, vinyl chloride, vinyl acetate, styrene and the like. The compounds of this invention have two other reactive centers, namely a hydroxyl group and a basic nitrogen atom which make them especially useful as co-monomers in that the points of reactivity in the polymers so produced permit reaction of the polymer with acidic materials, either to cross-link or otherwise modify the polymer properties by either ester formation or salt formation.

The compounds of this invention are prepared by the reaction of 2-benzoylbenzimidazole with alkenyl magnesium halides in tetrahydrofuran. The Grignard complex is decomposed with acid and the product is isolated by basification of the aqueous phase. The alkenyl group in the compounds of this invention can be any easily polymerized lower alkenyl radical such as vinyl, allyl, methallyl and the like.

Our invention can be illustrated by the following examples:

Example 1

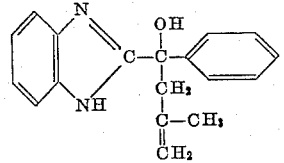

Two grams (0.009 mole) of 2-benzoylbenzimidazole in tetrahydrofuran is added to a solution of methallyl magnesium chloride in 60 ml. of tetrahydrofuran. The reaction mixture is acidified with 25% sulfuric acid. After the addition of ether, the phases are separated and the aqueous phase is washed once with ether and then neutralized with ammonium hydroxide. The precipitate is filtered to yield 1.82 g. of a product melting at 178–180°. Recrystallization of the product from ethanol-water yields 1.0 g. of 2-(α-methallyl-α-hydroxybenzyl)benzimidazole, M.P. 181–182°.

Analysis.—Calcd. for $C_{18}H_{18}N_2O$: C, 77.67; H, 6.52; N, 10.07. Found: C, 76.07, 77.94; H, 6.52, 6.31; N, 9.89, 9.98.

Example 2

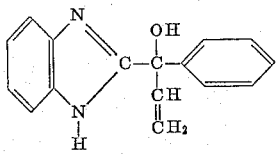

The procedure of Example 1 is followed using an equivalent amount of vinyl magnesium chloride in place of the metallyl magnesium chloride, to give 2-(α-vinyl-α-hydroxybenzyl)benzimidazole.

Example 3

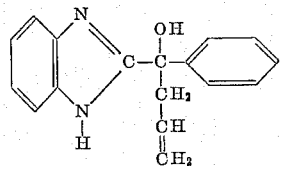

The procedure of Example 1 is followed using an equivalent quantity of allyl magnesium bromide in place of the methallyl magnesium chloride, to give 2-(α-allyl-α-hydroxybenzyl)benzimidazole.

Example 4

To a mixture of 100 g. of methyl methacrylate and 10 g. of 2-(α-methallyl-α-hydroxybenzyl)benzimidazole at room temperature is added 0.5 g. of benzoyl peroxide. The co-polymer is formed either by letting the mixture stand for several days or by moderate warming in a few hours. It can be machined and otherwise used in the usual manner for such polymers.

We claim:
1. A compound of the formula

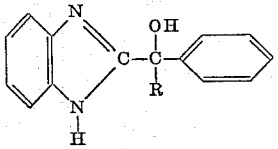

in which R is lower alkenyl in which the carbon to carbon double bond is in the terminal position.
2. 2-(α-methallyl-α-hydroxybenzyl)benzimidazole.
3. 2-(α-vinyl-α-hydroxybenzyl)benzimidazole.
4. 2-(α-allyl-α-hydroxybenzyl)benzimidazole.

References Cited in the file of this patent

Eiegart, et al.: J. Am. Chem. Soc., vol. 79, pp. 4391–4 (1957).

Hollingshead et al.: Chem. Abstracts, vol. 52, col. 14845 (1958).